United States Patent [19]

Littlewood

[11] Patent Number: 4,879,712

[45] Date of Patent: Nov. 7, 1989

[54] COMMUNICATIONS SWITCH

[76] Inventor: Morgan Littlewood, Unit 8, 17 Como Avenue, South Yarra, Melbourne, Australia, 3141

[21] Appl. No.: 239,236

[22] Filed: Sep. 1, 1988

[30] Foreign Application Priority Data

Sep. 2, 1987 [GB] United Kingdom ................. 8720605

[51] Int. Cl.[4] .............................................. H04J 3/26
[52] U.S. Cl. ...................................................... 370/60
[58] Field of Search .................... 370/54, 60, 94, 4, 61

[56] References Cited

U.S. PATENT DOCUMENTS

| 4,516,238 | 5/1985 | Huang | 370/60 |
|---|---|---|---|
| 4,603,416 | 7/1986 | Servel et al. | 370/60 |
| 4,661,947 | 4/1987 | Lea et al. | 370/60 |

FOREIGN PATENT DOCUMENTS

A2165124 4/1986 United Kingdom .
87/02535 4/1987 World Int. Prop. O. .

OTHER PUBLICATIONS

"Applications of Self-Routing Switches to LATA Fiber Optic Networks", by C. Day et al., Proc. ISS '87, pp. 519–523, Mar. 1987.

K. E. Batcher, "Sorting Networks and Their Applications", AFIPS 1968, Spring Joint Computing Conference, pp. 307–314.

J. F. Day, J. N. Giacopelli and J. Hickey, "Applications of Self-Routing Switches to LATA Fiber Optic Networks", ISS 87, Phoenix, Mar. 1987.

P. Kirton, J. Ellershaw and M. Littlewood, "Fast Packet Switching for Integrated Network Evolution", ISS 87, Phoenix, Mar. 1987, pp. B6.2.1–B6.2.7.

R. J. McMillen, "A Survey of Interconnection Networks", IEEE Globecom 84, Nov. 1984.

G. W. R. Luderer, J. J Mansell, E. Messerli, R. E. Staehler, and A. K. Vaidya: "Wideband Packet Technology for Switching Systems", ISS 87, Phoenix, Mar. 1987.

Y. S. Yeh, M. G. Hluchyj, A. S. Acampora: "The Knockout Switch: A Simple Modular Architecture for High Performance Packet Switching", ISS 87, Phoenix, Mar. 1987.

IEEE Global Telecommunications Conference Proceedings, vol. 1, 1984; A. Huang et al., "Starlite: A Wideband Digital Switch", New York, pp. 5.3.1–5.3.5.

IBM Technical Disclosure Bulletin, vol. 27, No. 4B, Sep. 1984, pp. 2704–2708, New York, M. Melas: "Variable Configuration Hybrid Space and Packet Switching Network".

IEEE Transactions on Communications, vol. Com. 28, No. 1. Jan. 1970, pp. 7–21, New York; M. Arozullah et al., "A Microprocessor Based High Speed Space-Borne Packet Switch".

Primary Examiner—Robert L. Griffin
Assistant Examiner—Melvin Marcelo
Attorney, Agent, or Firm—Nixon & Vanderhye

[57] ABSTRACT

A communications switch comprises a multi-layer switch configuration each layer comprising a synchronized packet switch with a pre-circulation stage 12, circulation re-entry stage 14, intermediate stage 16, re-circulation exit stage 17 and final exit stage 18. A re-circulation stage 15 allows re-circulation of data from one synchronized packet switch to another synchronized packet switch via paths 35. A number of switch input nodes 32 and output nodes 34 have accesss to each of the synchronized packet switches.

17 Claims, 7 Drawing Sheets

COMMUNICATIONS SWITCH

The present invention relates to a communications switch. In particular the invention relates to a type of communications switch wherein information is transferred through the switch in a packet format, packets pass through the switch with constant delay and in a parallel formation which is referred to as a wave. If contention for resources occurs in a switch of this type, the unsuccessful packets can be recirculated back to an earlier stage of the switch and will be provided with a recirculation entry and leaving point. A switch of this type is from this point referred to as a synchronised packet switch.

Synchronised packet switches may be used to form a communications network which may transfer information of a variety of services including high speed applications such as high speed data and video. An example of a synchronised packet switch is described in an article titled "Applications of Self-Routing Switches to LATA Fiber Optic Networks" by C. Day, J. N. Giacopelli and J. Hickey for "Proceedings of the International Switching Symposium" in 1987. The switch described can switch 45 megabit per second information channels with 128 of these channels being switched in parallel, providing a maximum capacity of approximately 6 gigabit per second.

Packet switches with greater fault tolerance, higher information channel rates and a higher total capacities may be required if the switches are to reliably carry a large number of high speed applications. The present invention is concerned with seeking to provide a packet switch capable of carrying higher information channel rates, to provide a switch with a greater total capacity and to provide a switch which has a high degree of fault tolerance. Such a packet switch with these improved characteristics is required not to alter the order of the packets of a connection.

According to the invention there is provided a communications switch characterised in that it consists of a plurality of synchronised packet switches with at least one of these switches having a recirculation path to another, a plurality of input switch nodes which each terminate an input line and have access to at least one input of one of the synchronised packet switches and a plurality of output switch nodes which are accessed by at least one output of one of the synchronised packet switches and have access to at least one output line.

The synchronised packet switches can each switch packets of information independently.

Such a configuration provides a plurity of paths between input switch nodes and output switch nodes wherein the plurality of paths can be through a plurality of synchronised packet switches. The advantage of the invention is that the plurality of paths can provide higher transmission rates, higher total capacity and greater fault tolerance. The total capacity of the multi-layer switch is substantially equal to the sum of the maximum capacities of the individual synchronised packet switches.

In a preferred embodiment, all the synchronised packet switches have substantially similar delay characteristics: All substantially have the same constant delay between their inputs and the recirculation path entry point; All substantially have the same delay between the recirculation path entry point and the recirculation path leaving point; All substantially have the same delay between the recirculation path leaving point and the outputs. In this preferred embodiment the synchronised packet switches can be operated relatively out of phase such that the recirculated packets of one synchronised packet switch can be fed into the recirculation path entry point of the synchronised packet switch which is closest behind in phase. A cyclic arrangement of synchronised packet switches wherein each synchronised packet switch recirculate packets to the next synchronised packet switch in the cycle is preferred. Preferably the phase delay between consecutive layers is greater than than the phase delay of the recirculation path. The advantage of this preferred embodiment is that the higher transmission rates and the higher total capacity can be achieved without changing the order of the packets passing through the switch.

In a preferred embodiment, the multi-layer switch comprises N synchronised packet switches and M output switch nodes wherein each of the M output switch nodes is accessed by at least one output of each of the N synchronised packet switches. An advantage of this preferred embodiment is that it provides improved flexibility allowing transmission from an input switch node to any of the M output switch nodes via any of the synchronised packet switches which the input switch node has access to.

Preferred embodiments of the invention will now be described, by way of example, with reference to the accompanying diagrammatic drawings, in which.

Figure 7:
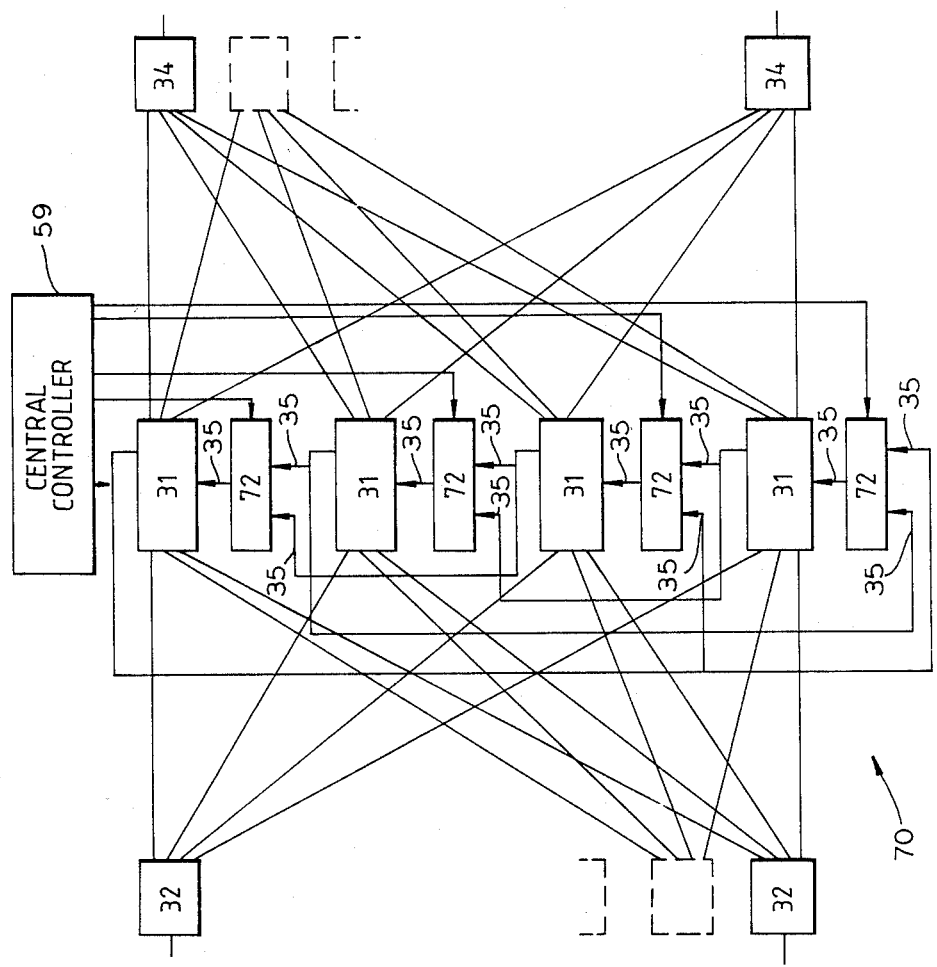

FIG. 7 if a view of the interconnections between the synchronised packet switches such that some degree of fault tolerance is achieved.

Figure 1:
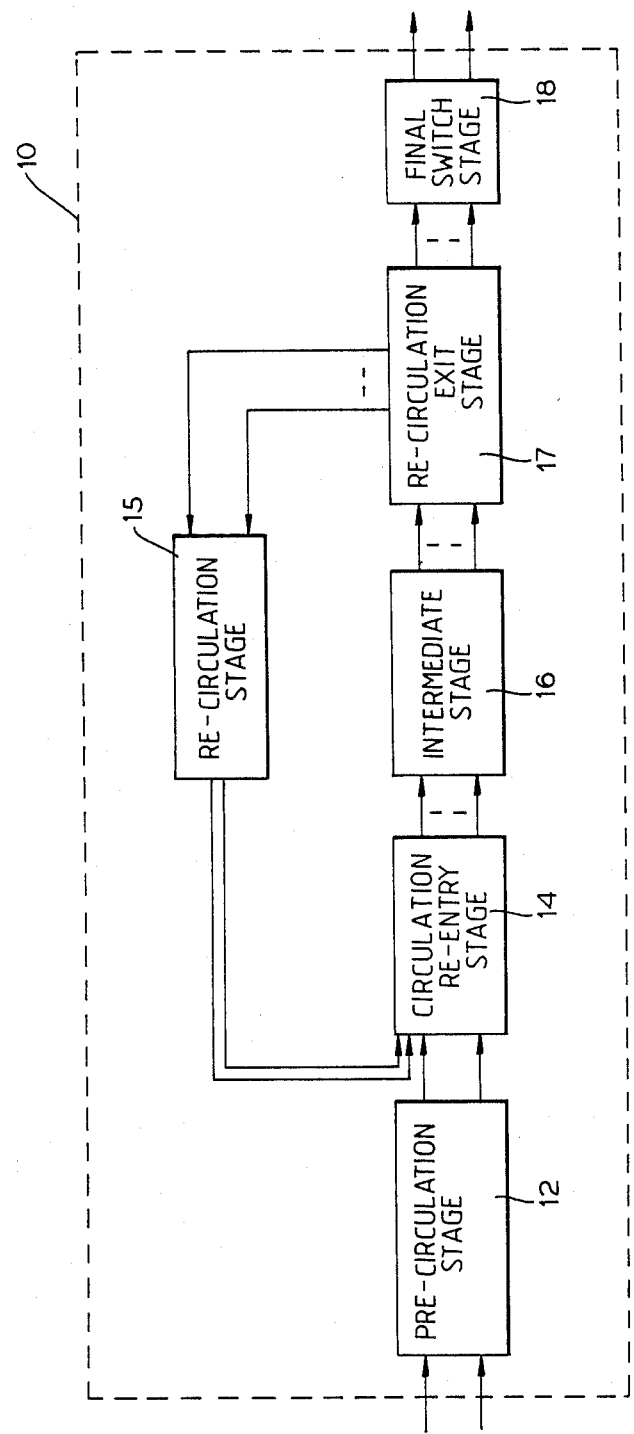
FIG. 1 is a view of a general synchronised packet switch and its recirculation path.

Referring to FIG. 1, this shows a synchronised packet switch configuration that can be used within the invention. A synchronised packet switch 10 comprises of a pre-circulation stage 12, a circulation re-entry stage 14, an intermediate stage 16, a recirculation exit stage 17, a recirculation stage 15 and a final switch stage 18. Each stage accepts parallel inputs of synchronised packets. In this example the packets have a fixed length of 36 bytes so that the period of each wave is constant and each of the stages accepts inputs and transmits outputs at the channel rate of 140 Mbit/s. Note that the delay across each stage of the switch 12 to 18 is constant and the packets pass through each stage as a synchronised wave. The channel rate of each switch stage is maintained by a master clock (not shown) and from this master clock a packet start signal (not shown) is derived for each stage to indicate that a new wave of packets is entering that stage. Elastic buffers (not shown) can be used at the input of any stage to align the wave of input packets.

Figure 2:
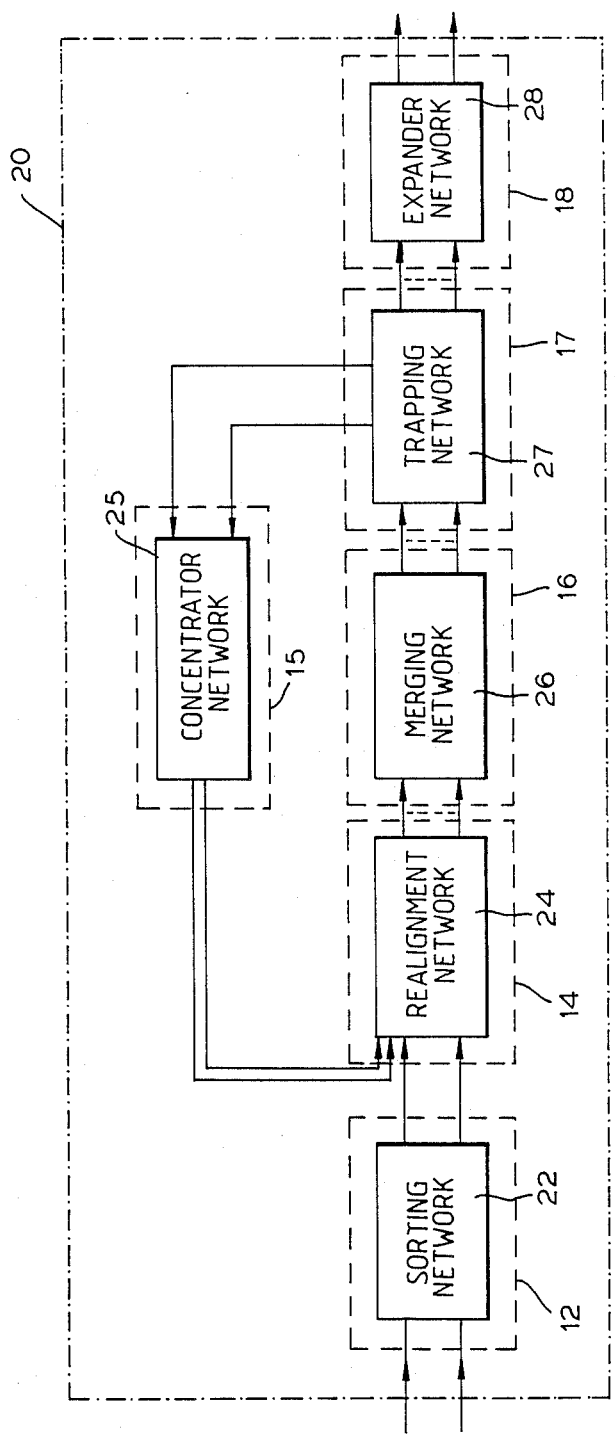
FIG. 2 is a synchronised packet switch of the STAR-LITE type.

Referring now to FIG. 2, this shows a specific form 20 of the synchronised packet switch 10 and similar to that described in U.S. Pat. No. 4,516,238 (Huang et al) and in an article by A. Huang and S. Knauer entitled "Starlite: A wideband Digital Switch" for the "Proceedings of the IEEE Conference on Global Communications 1984". The switch 20 is thus conveniently referred to as the Starlite switch.

The packets passing through each stage of the switch 20 consist of an information field and a header with a destination address and an activity indicator. It the activity indicator is TRUE there is a packet to be switched to the outputs and if it is FALSE there is not a packet to be switched.

The opeation of the Starlite switch 20 and its classification as a synchronised packet switch is explained by the following:

The pre-circulation stage 12 consists of a sorting network 22 which sorts the inputs in order of their destination address.

The circulation re-entry stage 14 consists of a realignment network 24 which realigns the recirculated packets from the recirculation stage 17 with the packets from the pre-circulation stage 12. The intermediate stage 16 consists of a merging network 26 which merges the sorted inputs from the pre-circulation stage 12 with the sorted inputs from the circulation stage 15 into one sorted sequence of inputs to the recirculation exit stage 17.

The recirculation exit stage 17 consists of a trapping network 27 which detects multiple inputs with packets to the same destination address and lets only one packet pass to each destination address through to the final switch stage 18. It traps the other packets and recirculates them to the recirculation stage 15. The recirculation stage 15 consists of a concentrator network 25 which takes a number of inputs which have either active or inactive packets and concentrates them so that all active packets are output at one end of the recirculation stage. The final switch stage 18 consists of a concentrator network and an expander network 28 which together switch the active packets to the output ports indicated by their destination addresses.

Figure 3:
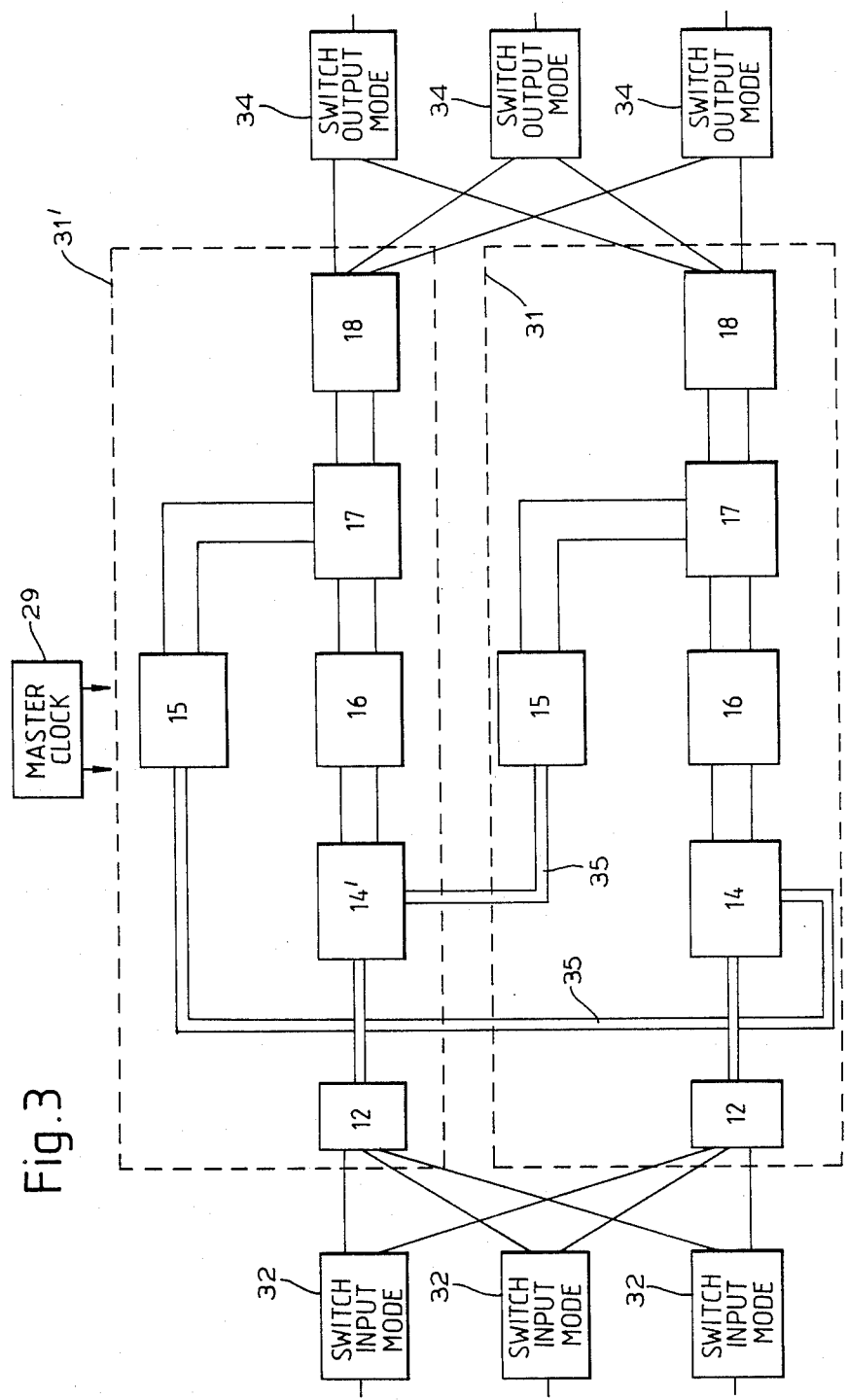
FIG. 3 is a view of an embodiment of the invention using two modified synchronised packet switches with associated input and output nodes.

Referring now to FIG. 3, this shows a multi-layer switch comprising of two synchronised packet switches 31, 31 arranged in parallel and modified relative to the configuration shown in FIG. 1 or 2 together with three switch input nodes 32 and three switch output nodes 34. In a preferred embodiment there would be 128 switch input nodes 32 and 128 switch output nodes 34.

Comparison with FIG. 1 shows that the recirculation stage 15, 15 of each synchronised packet switch 31, 31' is not connected to the recirculation entry stage 14, 14' of its own synchronised packet switch 31, 31', but is instead connected to the recirculation entry stage 14, 14' of the other synchronised packet switch 31, 31' via a recirculated data highway 35. Such a configuration of synchronised packet switches can be considered as a multi-layer switch.

Note that each switch input node 32 has access to each synchronised packet switch 31, 31' and that each synchronised packet switch 31, 31' has access to each switch output node 34.

Each of the synchronised packet switches have the same channel rate which in this example is 45 Mbit/s. The channel rate for all synchronised packet switches is maintained by a single master clock 29. The synchronised packet switches are the same size and have substantially similar delay characteristics which can be maintained by elastic buffers where necessary.

Each synchronised packet switch accepts 128 packets as inputs to its pre-circulation stage. These packets are all 36 bytes long. The circulation re-entry stage can accept 128 packets as inputs from the pre-circulation stage and 128 packets from the circulation stage.

The packet boundaries of the two synchronised packet switches 31, 31' are displaced relative to the other synchronised packet switch so that two packets never arrive at the same switch output node 34 simultaneously. Ideally, the packet boundaries of the two synchronised packet switches are displaced 18 bytes so that packets from one synchronised packet switch will arrive 18 bytes behind the last packets from the other synchronised packet switch and 18 bytes in front of the next packets from the other synchronised packet switch.

By using low delay stages, each synchronised packet switch can pass packets through its recirculation stage 15 and into the circulation re-entry stage of the next synchronised packet switch in time to be combined with the next wave of packets. Packets can also be recirculated by one synchronous packet switch 31, 31' and by the next synchronous packet switch 31, 31' back to the first synchronous packet switch 31, 31'. This can be done so that the packets that enter one synchronous packet switch can be recirculated repeatedly and eventually recombined with the next wave of packets that pass through that particular synchronous packet switch and so on. In this way, a packet is given every chance to be switched through the final switch stage of each layer and so non-blocking operation can be provided and packet mis-ordering avoided.

Figure 4:
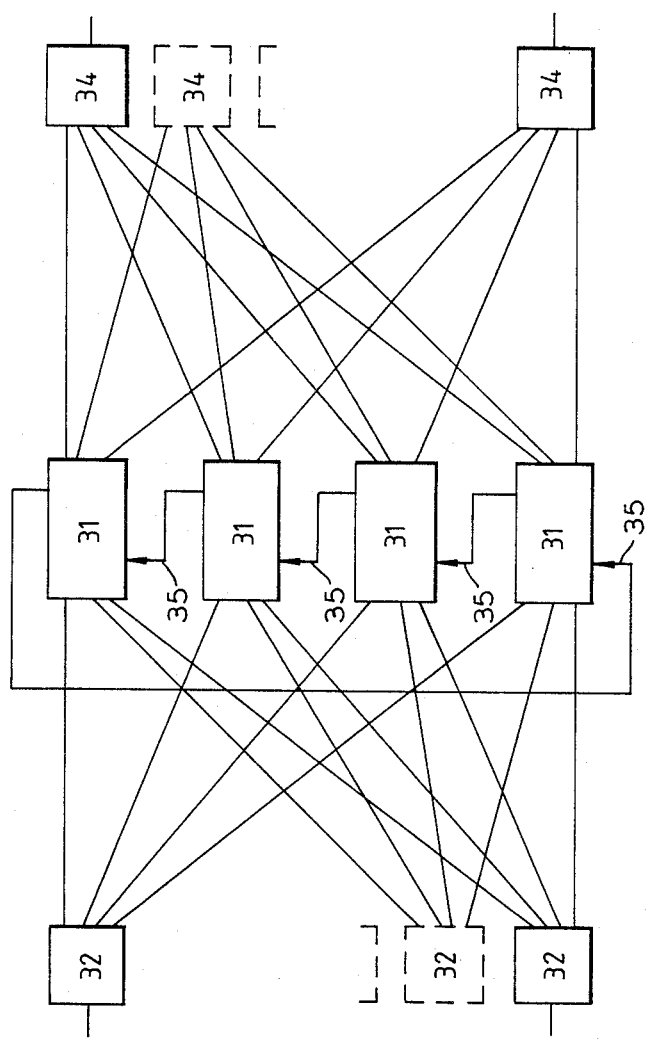
FIG. 4 is a view of an embodiment of the invention using four synchronised packet switches and associated switch input and output nodes.

Referring now to FIG. 4, this now shows the multi-layer switch with four synchronised packet switches, using the arrangement described in FIG. 3. Each switch input node 32 is still connected to each synchronous packet switch 31 and each synchronous packet switch is connected to each switch output node 34. The system can be expanded easily until the gap between packet boundaries of consecutive synchronised packet switches 31 is not sufficient for the recirculation without packet mis-ordering to be provided.

Figure 5:
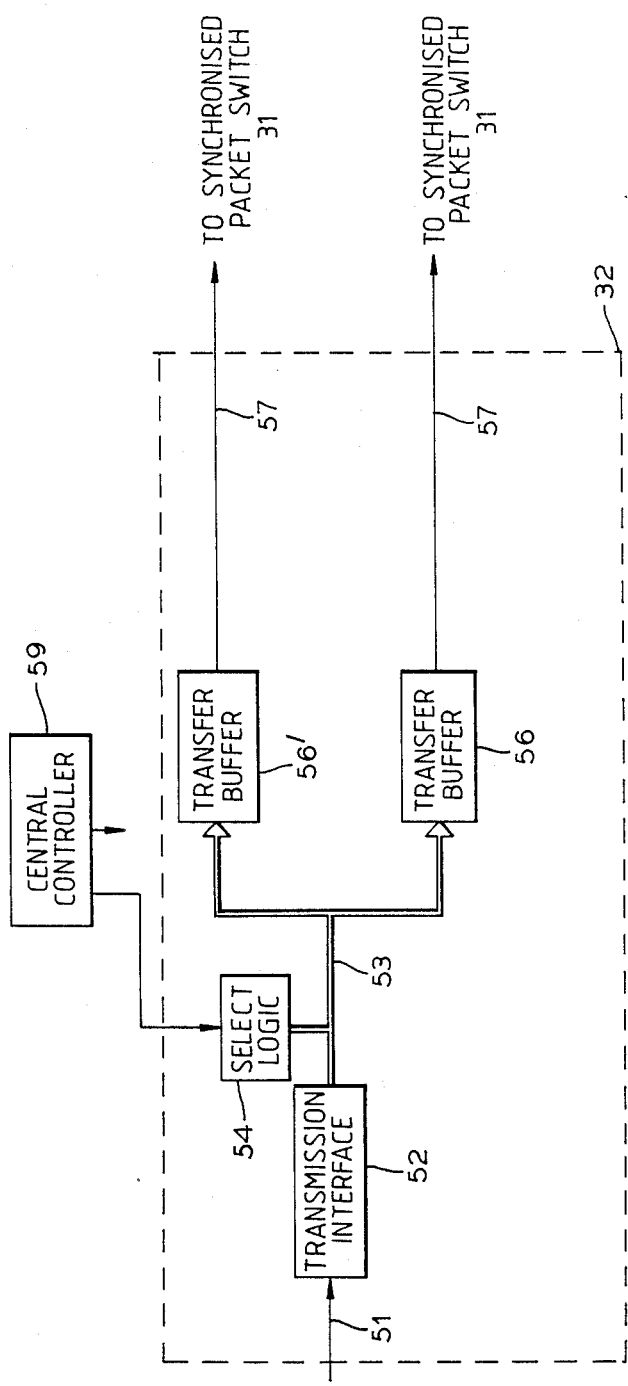
FIG. 5 is a view of an input switch node with access to two synchronised packet switches.

Referring now to FIG. 5, this shows details of one switch input node 32 which is interconnected with two synchronised packet switches. The switch input node consists of a transmission interface 52, select logic 54 and as many packet transfer buffers 56, 56' as there are synchronised packet switches 31 to be interconnected with. This switch input node 32 is typical of all switch input nodes in the multi-layer switch. This arrangement for a switch input node can be easily extended for a switch input node interconnected with more synchronised packet switches.

The transmission interface 52 must terminate a transmission line and buffer the packets that are arriving on that transmission line before sending them out on their output bus 53. The bandwidth of the bus 53 should be greater than the bandwidth of the transmission line 51 being terminated.

The select logic 54 determines the times when the transmission interface sends a packet, if it has one, via the switched communications bus 53. The select logic 54 also controls the switching of the bus 53 and determines the switch setting using a signal from a central controller 59 which indicates which of the synchronised packet switches should be used next via a broadcast signal to all switch input nodes. A faulty layer can hence be ignored through instruction from the central controller 59.

The packet transfer buffers 56, 56' accept packets sent to them and pass them to the synchronised packet switches at the appropriate time. The bandwidth of the input bus 53 may be much greater than the bandwidth of the line 57 to the synchronised packet switch.

Figure 6:
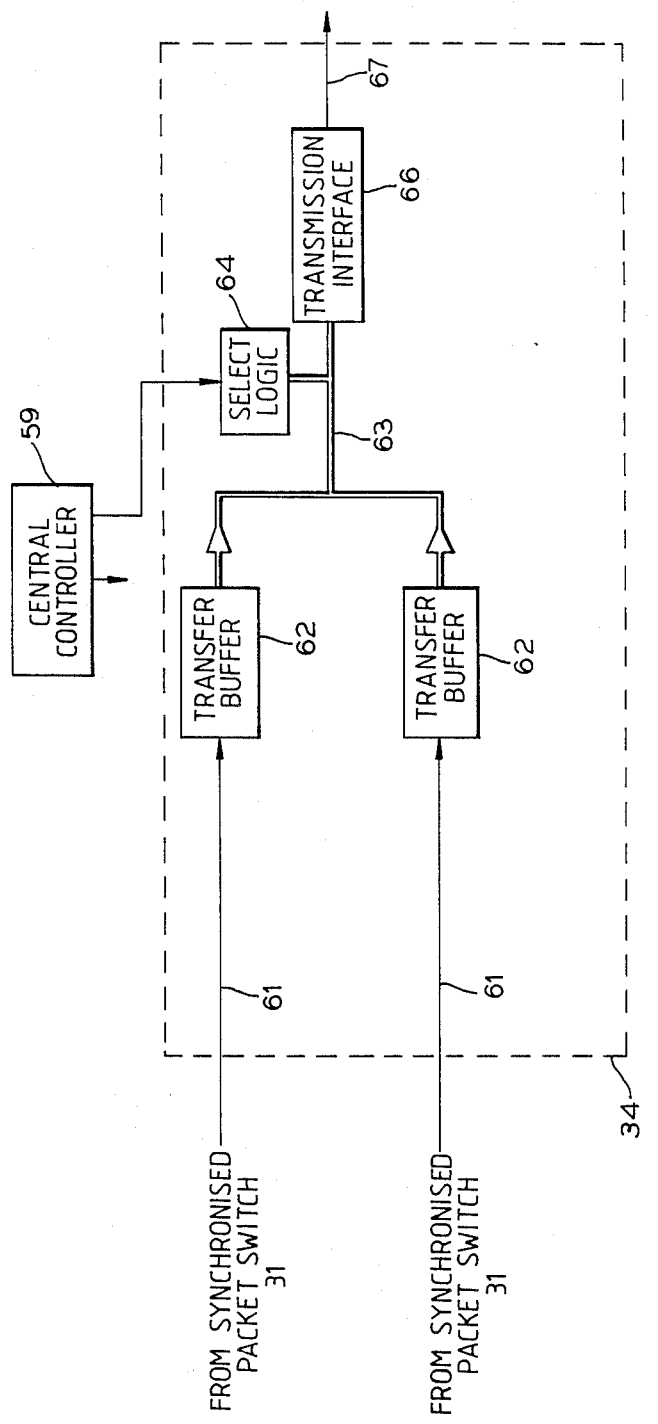
FIG. 6 is a view of an output switch node with accesses from two synchronised packets switches.

Referring now to FIG. 6, this shows details of one switch output node 34 which is interconnected with two synchronised packet switches 31. The switch output node consists of a packet transfer buffer 62 for each synchronised packet switch 31, select logic 64 and a transmission interface 66. This switch output node 34 is typical of all switch output nodes of the system. This arrangement for a switch output node can be easily extended for a switch output node interconnected with more synchronised packet switches.

The packet transfer buffers 62 accept packets from the synchronised packet switches 31 and pass them to the transmission interface 66 at the appropriate time. The bandwidth of the output bus 63 should be greater than the sum of the bandwidths of the lines 61 from the synchronised packet switches 31.

The select logic 64 determines when a packet is passed from a packet transfer buffer 62 to the transmission interface 66. The select logic also controls the switching of the switched bus 63 and determines the switch setting of the bus using a broadcast signal from the central controller 59 to each switch output node which indicates which of the synchronised packet switches should have packets available next. A faulty layer can hence be ignored through instruction from the central controller 59.

The transmission interface 66 accepts packets from the bus 63, buffers them and then puts them onto the transmission line 67. In the example, the bandwidth of the transmission line 67 would be as great as the bandwidth of the bus 63, but it could be less if statistical multiplexing is significantly used.

Referring now to FIG. 7, this shows details of an enhancement of the multi-layer switch 70 to provide tolerance of faults within a synchronised packet swtich 31. In this example, the enhanced multi-layer switch 70 consists of four synchronised packet switches 31 and four selectors 72.

In the multi-layer switch 30 shown in FIG. 4, each synchronous packet switch 31 recirculates packets to the next synchronous packet switch. In the enhanced multi-layer switch 70 each synchronised packet switch recirculates packets to the selectors 72 of the two synchronised packet switches next in succession. The selectors determine which of the recirculated data highways 35 should be accepted by this layer using a signal from the central controller 59 and appropriately aligns that wave of packets. Using its control of the selectors 72 and input node select logic 54 and output node select logic 64, the central controller 59 can hence cause a faulty layer to be avoided. The central controller 59 should act upon receipt of a fault detection signal or under command from an operator. This scheme can be easily extended to tolerate faults from more than one layer.

In the embodiment of the multi-layer switch described, any of the switch input nodes 32 can transmit a packet to any of the switch output nodes 34 via any of the synchronised packet switches 31 of the multi-layer switch. It is convenient that the synchronised packet switches 31 run at the same rate and have substantially similar delay characteristics. The staggering of packet boundaries is convenient to avoid contention problems at the inputs and outputs and to enable the recirculation of packets which contend unsuccessfully for resources between synchronised packet switches 31.

Although the examples were of multi-layer switches with four or two synchronised packet switches 31, it will be appreciated that there may be any of a convenient number of synchronised packets switches 31. In the optimum arrangement, the maximum number of synchronised packets switches 31 is restricted by the necessary phase delay between synchronised packet switches 31 if packets recirculated from one wave of packets are to be recombined with packets from the next wave.

It has also been stated that the multi-layer switch has a master clock 29 which synchronises all the synchronised packet switches 31. It is important that the clock rate is the same for all synchronised packet switches 31, but the synchronising pulse transmitted to each synchronised packet switch 31 need not be in phase.

The multi-layer switch described has a number of advantages. First of all, it is capable of switching many parallel high speed channels without mis-ordering the packets. Channels operating at speeds in excess of 45 Mbit/s are possible in synchronised packet switches 31 and N parallel synchronised packet switches can effectively provide N times that rate. From the point of view of the input lines, the system appears as a single high speed synchronised packet switch. Each synchronised packet switch, however, operates at a lower speed and so a minimum amount of high speed logic is required.

Another advantage of the multi-layer switch is that each of the synchronised packet switches is largely independent, and synchronised packet switches 31 can be added to or removed from the multi-layer switch without isolating any inputs from any outputs. Should a synchronised packet switch 31 fail, then the throughput of the multi-layer switch is correspondingly reduced, but the remainder of the system would survive intact. A certain amount of redundancy may be built in so that satisfactory levels of service are maintained even if a failure occurs (eg through a failure of a stage of one synchronised packet switch).

The major advantage of the multi-layer switch is that a higher throughput non-blocking switch can be provided using parallel synchronised packet switches which are themselves non-blocking. This provides a high speed communications switch using low speed technology with minimal blocking.

I claim:

1. A communications switch comprising a plurality of synchronised packet switches (31) connected by data links to a plurality of switch input nodes (32) and with the synchronised packet switch (31) connected by data links to a plurality of switch output nodes (34), at least one of the synchronised packet switches (31) recirculating packets to another of the synchronised packet switches (31) via a recirculated data highway (35).

2. A communications switch according to claim 1 characterised in that each synchronised packet switch (31) has access to each of the switch output nodes (34).

3. A communications switch according to claims 1 or 2 characterised in that each switch input node (32) has access to each synchronised packet switch (31).

4. A communications switch according to claim 1 or 2 characterised by control means (54, 64) for controlling the selection of packets at switch input nodes (32) or output nodes (34)

5. A communications switch according to any one of claims 1 or 2, characterised in that a common clock generator (29) ensures that all of the synchronised packet switches (31) operate at the same speed.

6. A communications switch according to claim 5 characterised in that all of the synchronised packet switches (31) have substantially similar delay characteristics.

7. A communications switch according to claim 6 characterised in that each of the synchronised packet switches (31) are relatively out of phase.

8. A communications switch according to claim 7 characterised in that the synchronised packet switches (31) are connected cyclically in order of phase by recirculated data highways (35) which carry recirculated packets.

9. A communications switch according to claim 8 characterised in that the synchronised packet switches (31) are sufficiently out of phase to enable packets to enter the first synchronised packet switch (31) and be repeatedly recirculated until they return to that first synchronised packet switch before the next wave of packets enters that first synchronised packet switch (31).

10. A communications switch according to claim 9 characterised in that the switch input node (32) transmits packets to the synchronised packet switches (31) so that packets enter the synchronised packet switches (31) in relation to the order that they were received by the switch input nodes (32).

11. A communications switch according to claim 10, characterised in that each switch input node (32) includes a transmission interface (52) for receiving packets for transmission to the switches (31) via a transfer buffer (56).

12. A communications switch according to claim 1 characterised in that the switch output node (34) accepts packets from the synchronised packet switches (31), buffers them in a packet transfer buffer (62) and passes them to a transmission interface (66) in relation to the order that they arrived from the synchronised packet switches (31).

13. A communications switch according to claim 10, characterised in that the synchronised packet switches (31) give preference to packets according to the number of times they have been recirculated.

14. A communications switch according to claim 10 characterised in that the synchronised packet switches (31) have recirculated data highways (35) to more than one other synchronised packet switch (31) for the purposes of carrying recirculated packets.

15. A communications switch according to claim 14 characterised in that selector means (72) are provided to allow passage of the data on the recirculated data highways (35) to be selectively passed to an associated packet switch (31).

16. A communications switch according to claim 15 characterised in that a central controller (59) can control the selector means (72) and select logic (54, 64) of a control means to cause one or more of the synchronised packet switches to be bypassed.

17. A communications switch according to claim 16 characterised in that the central controller (59) responds to fault information or operator requests.

* * * * *